UNITED STATES PATENT OFFICE.

CAMILLE DEGUIDE, OF IXELLES, BELGIUM, ASSIGNOR OF ONE-HALF TO DÉSIRÉ MARBAIS, OF CHARLEROI, BELGIUM.

PROCESS FOR OBTAINING BARIUM HYDRATE.

1,247,510.  Specification of Letters Patent.  Patented Nov. 20, 1917.

No Drawing.  Application filed March 6, 1917.  Serial No. 152,771.

*To all whom it may concern:*

Be it known that I, CAMILLE DEGUIDE, a subject of the King of Belgium, and a resident of Ixelles, Belgium, (whose postal address actually is Rue Marnière, Outreau, Pas de Calais, France,) have invented a new and useful Process for Obtaining Barium Hydrate, of which the following is a specification.

The present invention relates to a process for obtaining barium hydrate, by decomposing, by means of water, bibarytic silicate, which is infusible at the temperature of decomposition of the carbonate of barium, with a production of barium hydrate soluble and of monobarytic silicate insoluble in water.

Hitherto the production of barium hydrate has been obtained by the decomposition of the barium carbonate by heat; but this is possible only at a temperature comprised between 1400–1500 C., that is to say at a temperature at which the oxid of barium, derived from the decomposition of the barium carbonate will fuse, and it is impossible to bring about this decomposition of the carbonate of barium without operating in special crucible resisting the high temperature and the corrosive action of the caustic baryta. The use of these crucibles—always liable to serious deterioration and entailing moreover a large expenditure of fuel—does not permit this process to be applied for the industrial production of baryta.

It has been attempted to lower the temperature of decomposition of the barium carbonate by an addition of carbon but the use of crucibles is not thus avoided; in fact the oxid of barium, placed in an atmosphere of carbonic acid, is rapidly transformed below its point of decomposition into carbonate of barium and the result is that the decompositions are always incomplete.

The process of the present invention avoids the inconveniences due to the fusibility of the oxid of barium and to the facility with which this latter combines with the carbonic acid coming from the hearths; it thus allows crucibles to be dispensed with and a great economy in the use of combustible. This process is carried out in the following manner:—I mingle intimately in any suitable mixing device, silica finely ground or pulverized preferably to the size of grains or particles of ordinary cement, with a determined quantity of barium carbonate also ground or pulverized as finely as possible; the elements silica and carbonate of barium are calculated to comply with the formula $$SiO_2 + 2CO_3Ba,$$

that is to say for 60 parts of silica in the mixture there will be 394 of barium carbonate. The mixture of silica and of barium carbonate, dry or transformed into liquid paste by the addition of water, is introduced into tunnel furnace or into a rotary furnace similar to that employed for making cement, and is carried to a temperature of about 1400 to 1500 C. Under the influence of this temperature there is produced the following reaction:—

$$SiO_2 + 2CO_3Ba = SiO_2 2BaO + 2CO_2$$

There will thus take place the formation of a bibarytic silicate which is infusible at the temperature of decomposition of the barium carbonate; it will pass out from the furnace in the state of granulations, not melted, not having adhered to the walls of the furnace, and having undergone only the commencement of a scorifying action; further, it is stable to the action of dry carbonic acid.

This bibarytic silicate is then preferably ground or pulverized and put in contact with hot or cold water in order to obtain the following reaction:—

$$SiO_2 2BaO + xH_2O = SiO_2 BaO\,x\mathrm{aq} + BaO_2H_2$$

I obtain thus the formation of monobarytic silicate insoluble in water and the production of a solution of caustic baryta which can be evaporated, protected from the air, so as to be crystallized or to serve, in the state of solution, for any other use. The monobarytic silicate practically insoluble in water, is deposited at the bottom of the vat having served for the decomposition of the bibarytic silicate by water; it is washed several times by decantation by means of water to deprive it of the solution of caustic baryta which impregnates it and when the washing is sufficiently complete, there is added to the monobarytic silicate, washed and remaining at the bottom of the vat a calculated quantity of carbonate of baryta finely ground, calculated to comply to the formula:

$$SiO_2 BaO + CO_3 Ba$$

that is to say, for a quantity of 213 parts of monobarytic silicate calculated in the dry state, answering to the formula $SiO_2BaO$, there will be added 197 of barium carbonate; the monobarytic silicate and the barium carbonate are intimately mixed, either in the dry state or in the moist state; the product of the mixture is then sent to the rotatory furnace and carried to a temperature of about 1400 to 1500° C.; there then takes place the following reaction:—

$$SiO_2BaOxaq + CO_3Ba = SiO_22BaO + CO_2$$

There is thus again a formation of bibarytic silicate.

This bibarytic silicate is, preferably after grinding or pulverizing, put in contact with hot or cold water as already indicated above in order to obtain again monobarytic silicate and barium hydrate:—

$$SiO_22BaO + xH_2O = SiO_2BaOxaq + BaO_2H_2$$

The solution of barium hydrate, soluble, is separated from the monobarytic silicate, insoluble, by decantation or filtration.

The monobarytic silicate is thus continually regenerated with production of barium hydrate.

The carbonate of barium is equally regenerated when the solution of barium hydrate serves to caustify the carbonate of sodium or carbonate of potassium with a view to obtaining caustic soda or potash according to the formulæ:—

$$CO_3Na_2 + BaO_2H_2 = CO_3Ba + 2NaOH$$
$$CO_3K_2 + BaO_2H_2 = CO_3Ba + 2KOH$$

When the solution of barium hydrate is to serve for the extraction of sugar from molasses, the carbonate of barium is also regenerated by the action of carbonic acid upon the sucrate of barium; there will then be released saccharose soluble in water and insoluble carbonate of barium.

In the making caustic of sulfate of sodium or of potassium by the hydrate of barium, the latter is found again in the form of barium sulfate which it is necessary to transform into carbonate by known processes:—

(1) $SO_4Na_2 + BaO_2H_2 = SO_4Ba + 2NaOH$
(2) $SO_4Ba + 4C = BaS + 4CO$
(3) $2BaS + 2H_2O = BaO_2H_2 + Ba(SH)_2$
(4) $BaO_2H_2 + Ba(SH)_2 + 2CO_2 = 2CO_3Ba + 2H_2S$
(5) $2H_2S + O_2 = 2H_2O + S_2$

In the formula (1), the action of the hydrate of barium upon the alkali-metal sulfate gives sulfate of barium and a caustic alkali. The sulfate of barium treated at red heat by carbon gives barium sulfid and oxid of carbon. The sulfid of barium treated with water gives soluble barium hydrate and soluble sulfhydrate of barium. The solution of hydrate and of sulfhydrate of barium treated by carbonic acid, gives effect to the formation of barium carbonate which is thus regenerated and to the production of sulfureted hydrogen which can be transformed into sulfur by the reaction (5).

The manufacture of hydrate of barium according to the process forming the subject of this invention, by decomposing the bibarytic silicate by means of water, thus permits the monobarytic silicate to be continually regenerated and in the majority of cases the carbonate of barium also.

The application of the process is carried out very easily in a rotatory furnace but it can also be effected in any tunnel-provided furnace, after the mixture of monobarytic silicate and of barium carbonate has been put in briquet form by means of powerful presses; in this last case preliminary drying of the mixture is indispensable.

The process can be employed with advantage in the transformation of alkali-metal carbonates and sulfates into caustic alkalis, in the extraction of sugar from molasses and in the production of crystallized barium hydrate.

What I claim is:—

1. A process for obtaining barium hydrate, consisting in decomposing by water the bibarytic silicate ($SiO_22BaO$) with production of monobarytic silicate and of hydrate of barium.

2. A cyclic process for obtaining barium hydrate, which consists in decomposing by water the bibarytic silicate ($SiO_22BaO$) to produce monobarytic silicate ($SiO_2BaO$) and barium hydrate, regenerating bibarytic silicate by reacting barium carbonate with the monobarytic silicate so obtained, and decomposing this bibarytic silicate by water to produce thus in a cyclic process further barium hydrate and monobarytic silicate.

In testimony whereof I have signed my name to this specification, in the presence of two subscribing witnesses.

CAMILLE DEGUIDE.

Witnesses:
 LOUIS DEBAY,
 ALBERT JOURNÉE.